(12) United States Patent
Mendez-Rodriguez et al.

(10) Patent No.: US 9,165,383 B1
(45) Date of Patent: Oct. 20, 2015

(54) POINT CLOUD VISUALIZATION USING BI-MODAL COLOR SCHEMES BASED ON 4D LIDAR DATASETS

(75) Inventors: Javier Mendez-Rodriguez, Gainsville, VA (US); Christopher T. Rodgers, Adamstown, MD (US)

(73) Assignee: Exelis, Inc., Herndon, VA (US)

( * ) Notice: Subject to any disclaimer, the term of this patent is extended or adjusted under 35 U.S.C. 154(b) by 907 days.

(21) Appl. No.: 13/301,072

(22) Filed: Nov. 21, 2011

(51) Int. Cl.
*G09G 5/00* (2006.01)
*G06T 11/00* (2006.01)
*G05D 1/02* (2006.01)

(52) U.S. Cl.
CPC .............. *G06T 11/001* (2013.01); *G05D 1/024* (2013.01)

(58) Field of Classification Search
USPC ....................................................... 701/9, 514
See application file for complete search history.

(56) References Cited

U.S. PATENT DOCUMENTS

| | | | |
|---|---|---|---|
| 7,359,782 B2 | 4/2008 | Breed | |
| RE43,722 E | 10/2012 | Kennedy et al. | |
| 8,294,881 B2 | 10/2012 | Hellickson et al. | |
| 8,379,020 B2 | 2/2013 | Clifton | |
| 2008/0238919 A1 | 10/2008 | Pack | |
| 2009/0231327 A1 | 9/2009 | Minear | |
| 2010/0208981 A1 | 8/2010 | Minear | |
| 2011/0200249 A1* | 8/2011 | Minear et al. ................. | 382/154 |

OTHER PUBLICATIONS

Russell Targ, Michael J. Kavaya, R. Milton Huffaker, and Roland L. Bowles, Coherent lidar airborne windshear sensor: performance evaluation, Published: May 20, 1991, Appl. Opt. 30, 2013-2026.*
Popescu et al., A voxel-based lidar method for estimating crown base height for deciduous and pine trees, Dec. 2008, ScienceDirect, p. 767-781.*
Wang et al, A Lidar Point Cloud Based Procedure for Vertical Canopy Structure Analysis and 3D Single Tree Modelling in Forest, Dec. 2008, Sensors, p. 3938-3951.*
Beer, Mark; EPO Authorized Officer, International Search Report for PCT/US2013/027750, May 15, 2013.
Falkowski, Michael J. et al.; Automated Estimation of Individual Conifer Tree Height and Crown Diameter Via Two-Dimensional Spatial Wavelet Analysis of Lidar Data:, Canadian Journal of Remote Sensing, Apr. 3, 2006, p. 152-161.
Vu, Thuy T. et al., "Wavelet and Scale-Space Theory in Segmentation of Airborne Laser Scanner Data", Remote Sensing, May 22, 2001, Entire Document.

(Continued)

*Primary Examiner* — Stephen R Koziol
*Assistant Examiner* — Robert Craddock
(74) *Attorney, Agent, or Firm* — RatnerPrestia (57) ABSTRACT

A system is provided for alerting a crew in an airborne platform. The system includes a module for receiving point cloud data from a LIDAR system, including range data between the LIDAR system and multiple points in the point cloud. The system also includes a module for placing the multiple points into first and second zones, wherein the first zone has range data of points in the point cloud located within a first distance from the airborne platform, and the second zone has range data of points located further than the first distance. The first distance is predetermined by an operational environment of the airborne platform. The system further includes a color module for coloring the points in the first zone with a first color composition and coloring the points in the second zone with a second color composition. A color display is provided for displaying the colored points in the first and second zones.

15 Claims, 7 Drawing Sheets

(56) References Cited

OTHER PUBLICATIONS

Elhifnawy, H. et al.; "Wavelet Building Extraction From Lidar Data", Geomantics Technologies in the City, May 10, 2011, Entire Document.

Amagaa, Tsolmon; "Wavelet-Based Analysis for Object Separation From Laser Altimetry Data"; Feb. 17, 2003; Retrieved From the Internet: URL:http://www.itc.eu/library/Papers_2003/msc/gfm/amgaa_tsolmon.pdf.

Mendez-Rodriquez, Javier et al.; "Foliage Penetration by Using 4-D Point Cloud Data", Laser Radar Technology and Application, XVII, SPIE, 1000 $20^{TH}$ St. Bellingham WA, 98225-6705, USA, vol. 8379, No. 1, May 11, 2012.

Colucci Frank, "Digging Out From Brownout", Vertiflite 53(1) Spring 2007, 51-55.

Mackrides, Daniel G., "Progress Toward a Video-Rate, Passive Millimeter-Wave Imager for Brownout Mitigation", Retreived from the Internet: <URL:http://www.phasesensitiveinc.com/wp-content/uploads/2011/08/DSS11Paper.pdf>,(Aug. 2011), 7 pgs.

Nayegandhi, Amar, "Lidar Technology Overview" (Jun. 20-21, 2007), 66 pgs.

* cited by examiner

Color Index 1: 0 1 2 3 · · · · · · · · · · · · · · · · · · · · N

Color Index 2: 0 1 2 3 · · · · · · · · · · · · · · · · · · · · N

POINT CLOUD VISUALIZATION USING BI-MODAL COLOR SCHEMES BASED ON 4D LIDAR DATASETS

FIELD OF THE INVENTION

The present invention relates, in general, to visualization of point cloud data. More specifically, the present invention relates to visualization of point cloud data, derived from a laser detection and ranging (LIDAR) system, using bi-modal color schemes.

BACKGROUND OF THE INVENTION

Three-dimensional (3D) type sensing systems are commonly used to generate 3D images of a location for use in various applications. For example, such 3D images are used for creating a safe training environment for military operations or civilian activities; for generating topographical maps; or for surveillance of a location. Such sensing systems typically operate by capturing elevation data associated with the location of the target. One example of a 3D type sensing system is a Light Detection and Ranging (LIDAR) system. The LIDAR type 3D sensing systems generate data by recording multiple range echoes from a single pulse of laser light to generate a frame, sometimes referred to as an image frame. Accordingly, each image frame of LIDAR data includes a collection of points in three dimensions (3D point cloud), which correspond to multiple range echoes within a sensor's aperture. These points can be organized into "voxels" which represent values on a regular grid in a three dimensional space. Voxels used in 3D imaging are analogous to pixels used in the context of 2D imaging devices. These frames can be processed to reconstruct a 3D image of the location of the target. In this regard, each point in the 3D point cloud has an individual x, y and z value, representing the actual surface within the scene in 3D.

A three dimensional (3D) point cloud is a dataset composed of spatial measurement of positions in 3D space (x, y, z), where x and y are cross-range spatial positions and z is height. The 3D data is generated by systems capable of scanning surfaces, such as stereo paired cameras, radars, LIDAR sensors, etc. Point cloud visualization, in general, is of great interest within the defense and geospatial community. Image and geospatial analysts, however, have difficulty using point cloud data alongside traditional 2D imagery. In many situations, point cloud datasets are viewed by coloring height, or altitude (z) information based on a single color composition.

One color composition may be based on a hue, saturation, and intensity (HSI) color space. Hue is the color, saturation is the color contrast, and intensity is the brightness. An HSI color space for coloring point clouds is disclosed in U.S. Patent Publication No. 2009/0231327, published on Sep. 17, 2009, which is incorporated herein by reference in its entirety. That application is titled: "Method For Visualization of Point Cloud Data".

Another U.S. Patent Application, Publication No. 2010/0208981, which is titled "Method For Visualization of Point Cloud Data Based on Scene Content", published on Aug. 19, 2010, includes a description of using radiometric information of a 2D image for coloring point clouds. This application is incorporated herein by reference in its entirety. In this application, radiometric information is obtained from 2D imagery and used to color a point cloud in 3D space. Although the application states that the coloring schemes may be applied to multiple frames of data, there is no disclosure of using multi-color compositions in real-time for 4D point cloud applications.

Thus, color maps have been used to help visualize point cloud data. For example, a color map may be used to selectively vary color of each point in a 3D point cloud in accordance with a predefined variable, such as altitude. In such systems, variations in color are used to signify points at different heights, or altitudes above ground level. No methodology exists, however, for coloring a time sequence of point clouds in a real-time environment. No methodology exists for using multi-color compositions in real-time for object hazard avoidance, without having prior position information.

Advances in LIDAR systems have been pushing towards 4D data (x, y, z and time, t). These systems are capable of operating in the same way as a video camera operates, at 30 frames per second. Sampling a scene in a 4D domain is very attractive in military and civilian applications. As will be explained, the present invention uses 4D measurements recorded by a LIDAR system to generate 3D video. The present invention visualized the data for hazard avoidance, as well as 3D information. In order to have both functionalities (hazard avoidance and 3D information) at the same time, two separate color compositions are used. One color composition is used for coloring a scene based on height, while the second color composition is layered on top of the first color composition for coloring points that represent a hazard or a vertical obstruction to the viewer.

SUMMARY OF THE INVENTION

To meet this and other needs, and in view of its purposes, the present invention provides a method of point cloud visualization. The method includes the steps of: (a) receiving point cloud data, including range data between a range sensor and multiple points in the point cloud; (b) dividing the multiple points into a plurality of zones, each zone including points located within a respective interval of range; (c) coloring the multiple points using a plurality of colors; and (d) displaying the multiple points with the plurality of colors.

Receiving the point cloud data includes receiving the point cloud data from a LIDAR system; and receiving scanning angle data to determine orientation of each of the multiple points within the field of view (FOV) of the range sensor.

Dividing the multiple points includes dividing the multiple points into first and second zones. The first zone includes points located closely to the range sensor, closely defined as a range interval less than a predetermined threshold value. The second zone includes points located remotely from the range sensor, remotely defined as a range interval greater than the predetermined threshold value.

The predetermined threshold is determined by an operational environment of an airborne platform.

Coloring the multiple points includes the steps of receiving a color composition (CC) for each of the zones; and assigning color index values to each of the zones. Each color index value is incremented from a value of 1 up to a maximum number of points in the respective zone. The color index value is based on a distance between the range sensor and a respective point in the respective zone. The color index value is based on a minimum distance between an airborne platform housing the range sensor and a ground terrain below the airborne platform. The distance and minimum distance are height of each point above the ground terrain and height of the airborne platform above the ground terrain, respectively.

The color composition for each of the zones includes a 3×N matrix in which each column corresponds to one of an RGB color space, or one of an HSI color space.

Coloring the multiple points includes the steps of: (a) determining a first range value between the range sensor and a first point in the point cloud; (b) determining a second range value between the range sensor and a second point in the point cloud; (c) determining a change in value between the first range value and the second range value; and (d) coloring the first point differently from the second point, if the change in value exceeds a predetermined value.

Determining the change in value includes: calculating a derivative of an index vector as a function of range; and changing the color of the second point as compared to the color of the first point, if the derivative is not continuous between the first and second points.

Another embodiment of the present invention is a system for point cloud visualization. The system includes a module for receiving point cloud data from a LIDAR system disposed in an airborne platform, including range data between the LIDAR system and multiple points in the point cloud, a module for placing the multiple points into first and second zones, wherein the first zone includes range data of points in the point cloud located within a first distance from the airborne platform, and the second zone includes range data of points in the point cloud located further than the first distance from the airborne platform, a color module for coloring the points in the first zone with a first color composition and coloring the points in the second zone with a second color composition, and a color display for displaying colored points in the first zone and colored points in the second zone.

The system also includes a threshold setting module for setting a predetermined threshold, of the airborne platform, and the first distance extends from the airborne platform to the predetermined threshold.

The system also includes an indexing module for assigning color index values to each of the zones. Each color index value is incremented from a value of 1 up to a maximum number of points in the respective zone. The color index value depends on a distance between the LIDAR system and a respective point in the respective zone.

The color index value further depends on a minimum distance between the airborne platform and a ground terrain below the airborne platform.

The indexing module includes: a derivative calculator for calculating a derivative of an indexing function containing two points in a respective zone. The color display is configured to change the colors between the two points in the respective zone, if the derivative is not continuous between the first and second points.

In yet another embodiment, the present invention is a system for alerting a crew in an airborne platform by viewing a display. The system includes:

a module for receiving point cloud data from a LIDAR system disposed in an airborne platform, including range data between the LIDAR system and multiple points in the point cloud, a module for placing the multiple points into first and second zones, wherein the first zone includes range data of points in the point cloud located within a first distance from the airborne platform, and the second zone includes range data of points in the point cloud located further than the first distance from the airborne platform, and the first distance is predetermined by an operational environment of the airborne platform, a color module for coloring the points in the first zone with a first color composition and coloring the points in the second zone with a second color composition, and a color display for displaying colored points in the first zone and colored points in the second zone, wherein the color composition in the first zone alerts the crew.

The system may also include: an indexing module for assigning color index values to each of the zones, in which each color index value is incremented from a value of 1 up to a maximum number of points in the respective zone. The color index value depends on a distance between the LADAR system and a respective point in the respective zone. The color index value is based on the following equations:

$$\text{Index1} = \text{round}\left(\left|\frac{|Z_i - Z_0|}{Th} - 1\right| * N_1\right) \quad \text{Eq. 1}$$

$$\text{Index2} = \text{round}\left(\left|\frac{|(Z_i - Z_0 + Th)|}{Z_{min} - Z_0 + Th} - 1\right| * N_2\right) \quad \text{Eq. 2}$$

where
$N_1$ is a length of one color composition for color index 1,
$N_2$ is a length of another color composition for color index 2,
$Z_0$ is platform altitude
$Z_i$ is height of each point in the cloud,
Th is the predetermined threshold value, and
$Z_{min}$ is the minimum height of the platform.

It is understood that the foregoing general description and the following detailed description are exemplary, but are not restrictive of the invention.

BRIEF DESCRIPTION OF THE FIGURES

The invention is best understood from the following detailed description when read in connection with the accompanying figures, with like elements having the same reference numerals. When pluralities of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

The present invention provides a bi-modal coloring method and system based on two multi-color composition scales to help visualize a scene in real-time and help locate potential hazards and vertical obstructions. As will be explained, one color composition is used to color a point cloud as a function of range (distance between sensor and various vertical obstructions), and the other color composition is used to color the point cloud as a function of height (z). It will be understood that the present invention is not limited to locating hazards and obstructions. Any 3D and 4D point cloud visualization application may benefit from the present invention, such as 3D automatic target recognition, data fusion, and persistent surveillance. Many aerial accidents occur from the difficulty of seeing a scene due to high turbid atmospheric conditions, clouds, dust, smoke, fog, etc.

The bi-modal coloring method and system provide situational awareness to pilots flying under obscured condition. The bi-modal coloring method requires an active system capable of determining range and height measurements at the same time. Radar and LIDAR systems are capable of generating point cloud datasets. A LIDAR system has an advantage of generating a high resolution point cloud, because it operates in optical wavelengths. The LIDAR system transmits a pulse of light, which illuminates a region of interest. Some of the transmitted light is scattered back and collected by the LIDAR's receiver. The scattered light is collected and measurements of the light's travel time in both directions (transmission and reception) are recorded. The recorded time is referred to herein as the time-of-flight (TOF).

Figure 1:
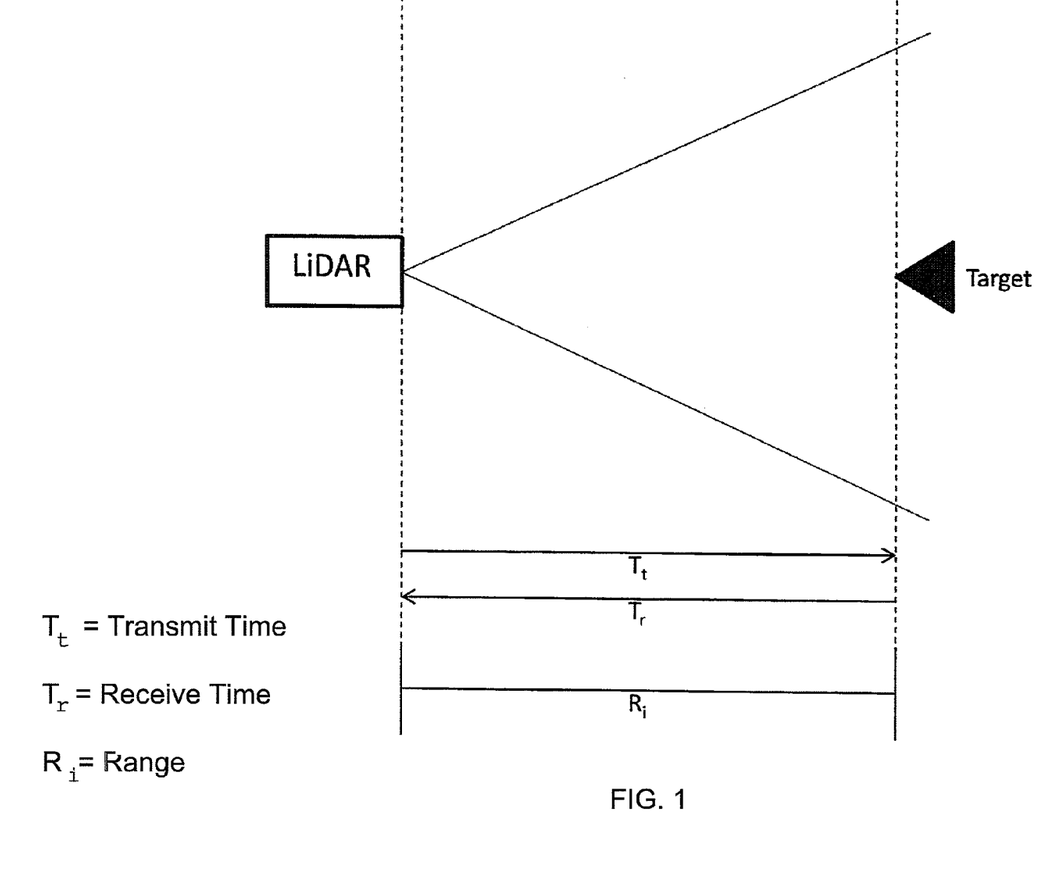
FIG. 1 is a functional diagram illustrating a LIDAR system determining range to a target of interest.

FIG. 1 illustrates a LIDAR system determining range of received echoes across the system's field-of-view (FOV). The system uses TOF to determine range to the target. As shown, TOF is the sum of the traveling time of the transmitted and received signals, which is equivalent to doubling the range and dividing by the speed of light, as follows:

$$TOF = T_t + T_r = (2*R_i)/c$$

$$R_i = (TOF*c)/2$$

where:
$T_t$ is Transmitting time
$T_r$ is Receiving time
$R_i$ is Range (distance between system and target)
TOF is Time Of Flight
C is Speed of light.

Figure 2:
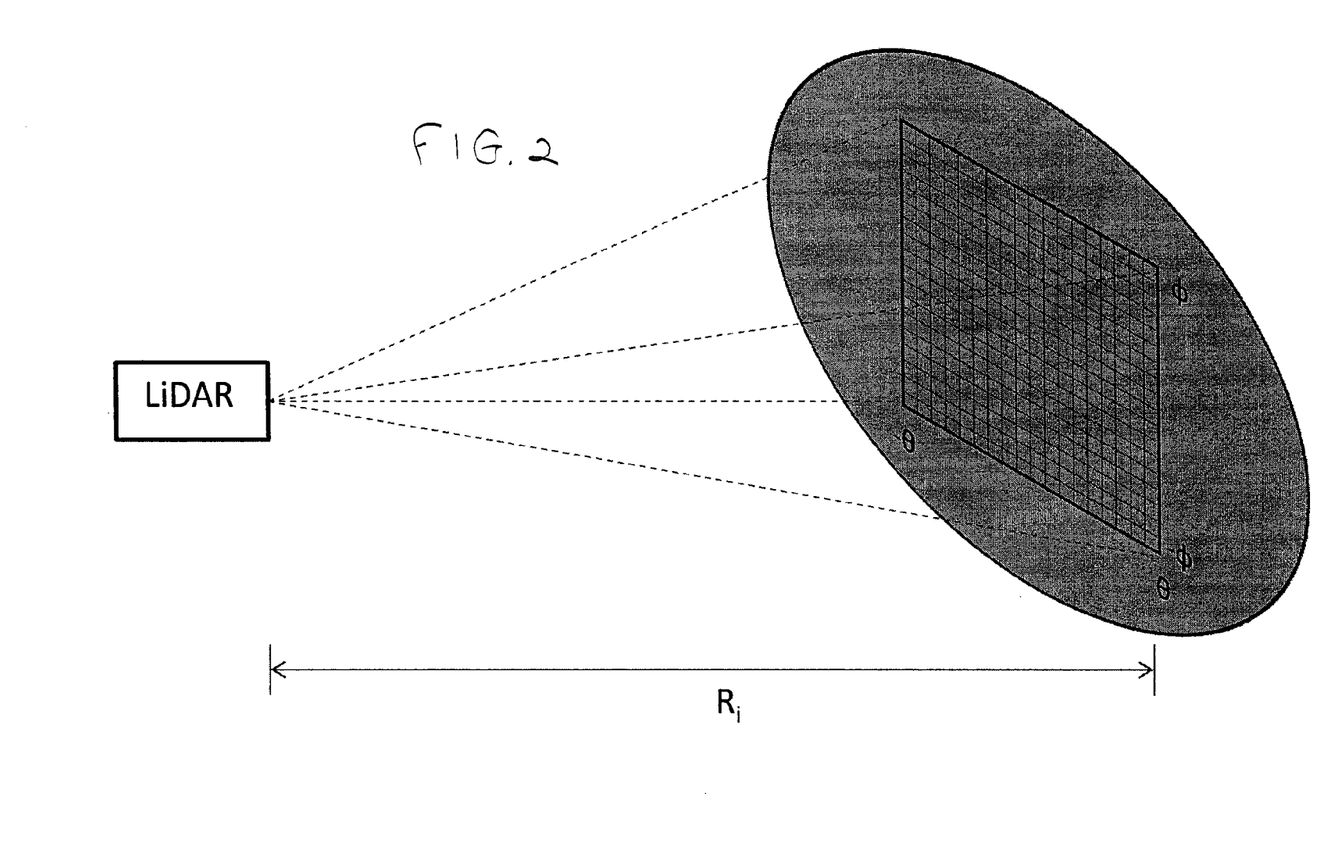
FIG. 2 is a functional diagram illustrating a scanning plane in the field of view of a LIDAR system.
Figure 3:
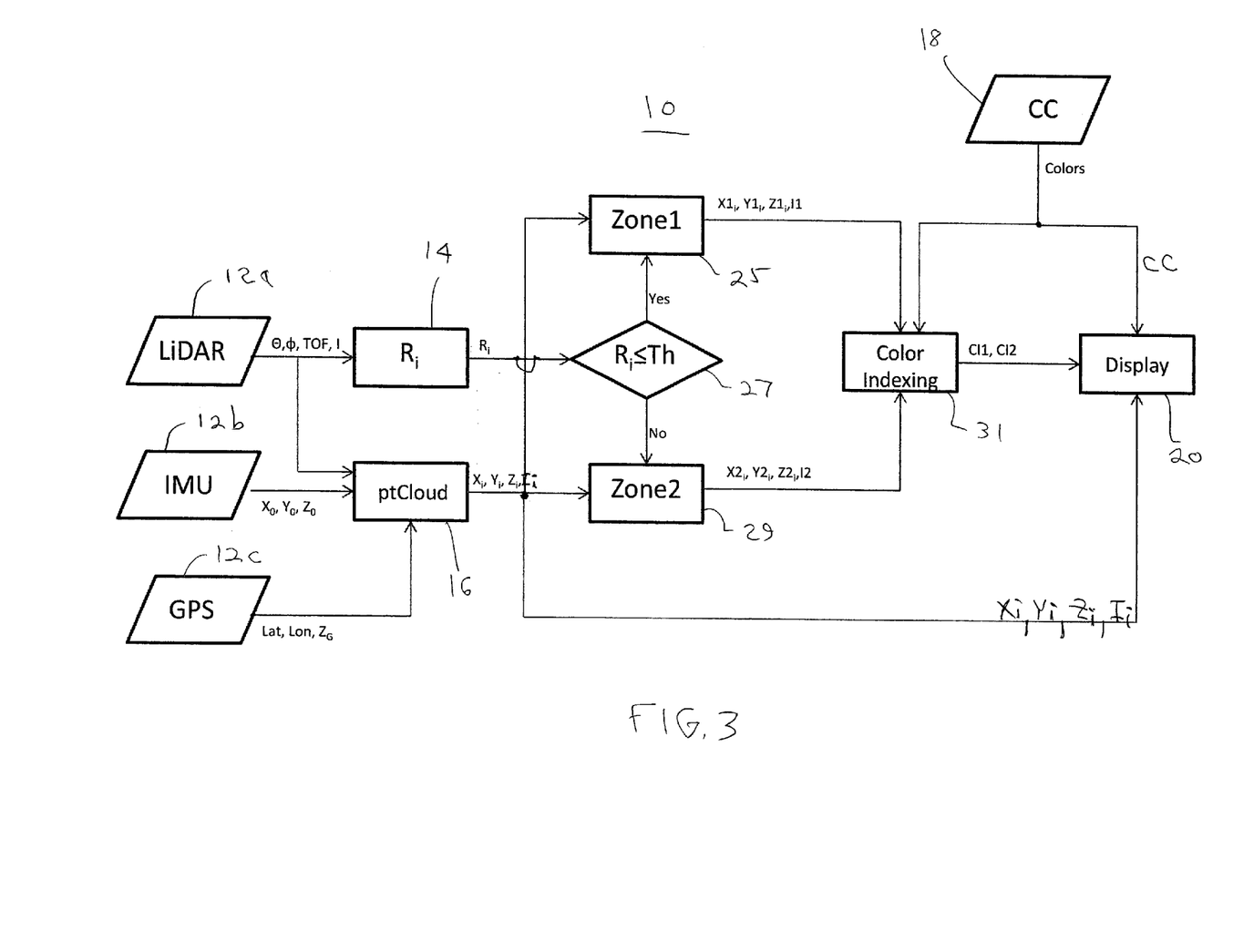
FIG. 3 is a block diagram of a bi-modal coloring system for point cloud visualization, in accordance with an embodiment of the present invention.

An example of a LIDAR scanning plane is shown in FIG. 2. The scanning plane is formed by azimuth ($\Theta$) and elevation ($\phi$) angles in the FOV of the LIDAR system. Referring next to FIG. 3, there is shown a bi-modal color generating system, generally designated as 10. As shown, system 10 includes three inputs: (1) LIDAR information from LIDAR system 12a; (2) metadata from LIDAR system 12a, IMU 12b and GPS 12c; and (3) color composition (CC) from module 18.

A typical LIDAR system records measurements of TOF for each transmitted pulse. If the system uses linear sensors, it has the advantage of measuring the amplitude of the received signal (intensity, I). The metadata includes platform position, platform attitude, laser pointing data, GPS coordinates, and the scanning angles across the scene ($\Theta$ and $\phi$). The platform position ($X_0$, $Y_0$, $Z_0$) is given by GPS 12c, which resides within the aircraft. The platform attitude is recorded by an inertial measuring unit (IMU) residing within the aircraft. The IMU records platform movements (roll, pitch and yaw) and heading. The laser pointing data is data of the direction in which the laser pulses are transmitted, measured, and recorded. The scanning angles are the receiver's field-of-view (FOV) across the x and y coordinates. These scanning angles are used to determine position of each point within the illuminated area, shown in FIG. 2. A 3D point cloud is formed by module 16 upon combining the TOF data with the metadata. This point cloud data may be presented as a function of scanning angles, or the data may be presented in Cartesian coordinates ($X_i$, $Y_i$, $Z_i$). The LIDAR measurements of TOF determine the range, Ri, of each detected point outputted from module 14. The range, Ri, is the distance between each detected point and the sensor's position (or airborne platform's position).

The range, Ri, is used by the present invention to split, or divide the point cloud data into two zones, namely, Zone 1 (element 25) and Zone 2 (element 29). Zone 1 is the region in which the pilot needs to be aware of any objects inside that region, as these objects are too close to the aircraft. This region is also referred to herein as an avoidance zone. Zone 2, on the other hand, does not represent any warning to the pilot, as described later, but provides additional information of objects inside the Zone 2 region.

The boundary between both zones is determined by decision box 27 using a predetermined threshold (Th), which may be selected by the user or crew. For example, if the threshold (Th) is set to 15 meters, then every object having a range equal to or less than the threshold value of 15 meters is considered too close to the aircraft. This is Zone 1. Objects in a range greater than 15 meters, on the other hand, are considered within Zone 2.

The output of each zone is a point cloud that is inputted into color indexing module 31. The module 31 determines a color index based on a respective color composition (CC) outputted from CC module 18. The indexing module 31 takes each point in the cloud, along with its associated CC, and assigns an index value to that respective point.

Equation 1 (Zone 1) and Equation 2 (Zone 2) are examples of equations implemented by system 10 to assign a color index to each point. Each equation depends on the height of each point ($Z_i$), in which i is incremented from 1 up to a maximum number, N, in the point cloud data set. In addition, the color indices depend on the sensor's height or altitude ($Z_0$), the predetermined threshold value (Th) (which may be determined based on the environmental operations of the aircraft), and the total number of colors in each color distribution ($N_1$ and $N_2$). In addition, as shown below, the Zone 2 Equation uses a minimum height ($Z_{min}$) for the entire point cloud.

$$\text{Index1} = \text{round}\left(\left|\frac{|Z_i - Z_0|}{Th} - 1\right| * N_1\right) \quad \text{Eq. 1}$$

$$\text{Index2} = \text{round}\left(\left|\frac{|(Z_i - Z_0 + Th)|}{Z_{min} - Z_0 + Th} - 1\right| * N_2\right) \quad \text{Eq. 2}$$

Each index value is used to color a respective point in the point cloud for viewing on display module 20.

Figure 4A:
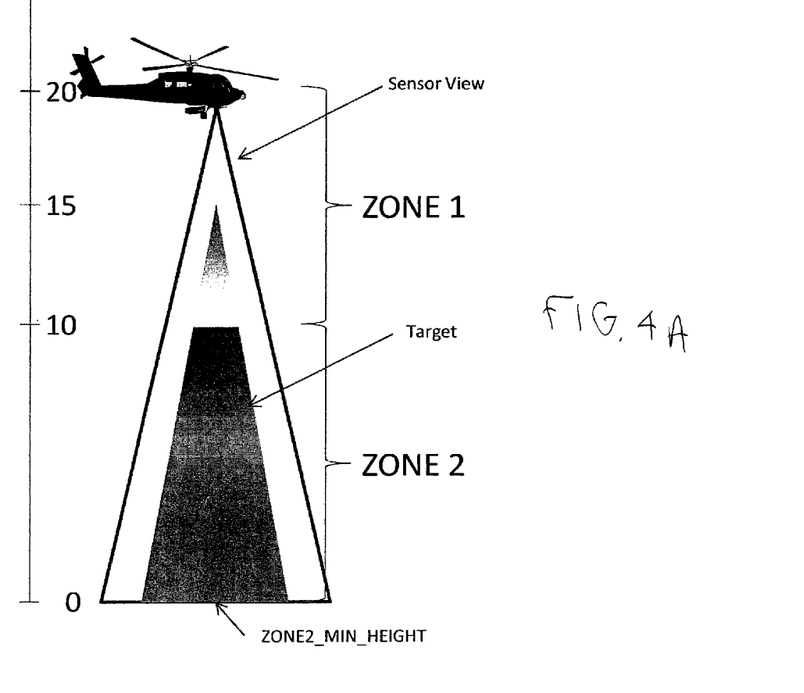
FIGS. 4A and 4B illustrate point cloud visualization using two zones, Zone 1 and Zone 2, in which each zone has a different coloring index (CI), in accordance with an embodiment of the present invention.
Figure 4B:
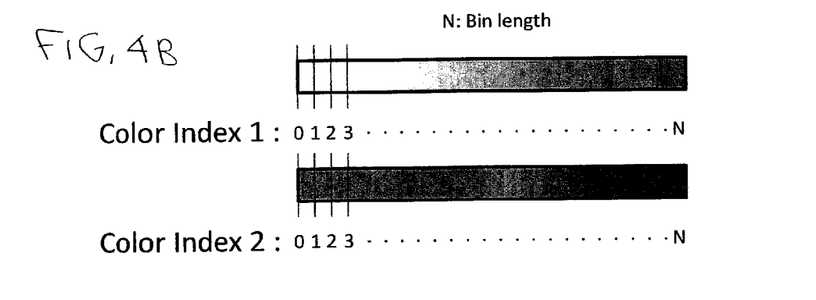

Referring next to FIGS. 4A and 4B, the concept of color indexing provided by module 31 of system 10 may be better appreciated. As shown in FIG. 4B, the color indexing module uses a length ($N_1$) of one color composition for color index 1 in Zone 1 and another length ($N_2$) of the other color composition for color index 2 in Zone 2. The color indexing is used in combination with the platform altitude ($Z_0$), height value of each point ($Z_i$) in the cloud, the predetermined threshold value (Th), and the minimum height value of the platform ($Z_{min}$), as exemplified by Equations 1 and 2. Thus, the color indexing of the present invention is based on the range information ($R_i$) of each zone, in which points close to the maximum height of each zone have high color scales.

The color composition used by the present invention may be a 3×N matrix, where each column corresponds to RGB, or HSI colors. The color composition may be of other types, such as HSV and CMY. Using multicolor compositions gives the viewer an advantage by providing easy interpretation of a scene when compared to viewing a scene using a gray scale or a single color composition.

In order to assign different colors into a point cloud, the color indexing module 31 determines a color index for each drastic change in height. This change in height is then linked to a change in color. For shaping these changes, system 10 organizes the point cloud data of each zone as [$X_1, Y_1, Z_1$, Index1] and [$X_2, Y_2, Z_2$, Index2], as outputted by modules 25 and 29, respectively. The color indexing module 31 sorts each point cloud in ascending order based on the respective color indices. After the data is sorted, color indexing module 31 calculates a derivative of the index vector as a function of Z to determine any discontinuities. It will be appreciated that the derivative is larger than zero, when a discontinuity is detected.

Figure 5:
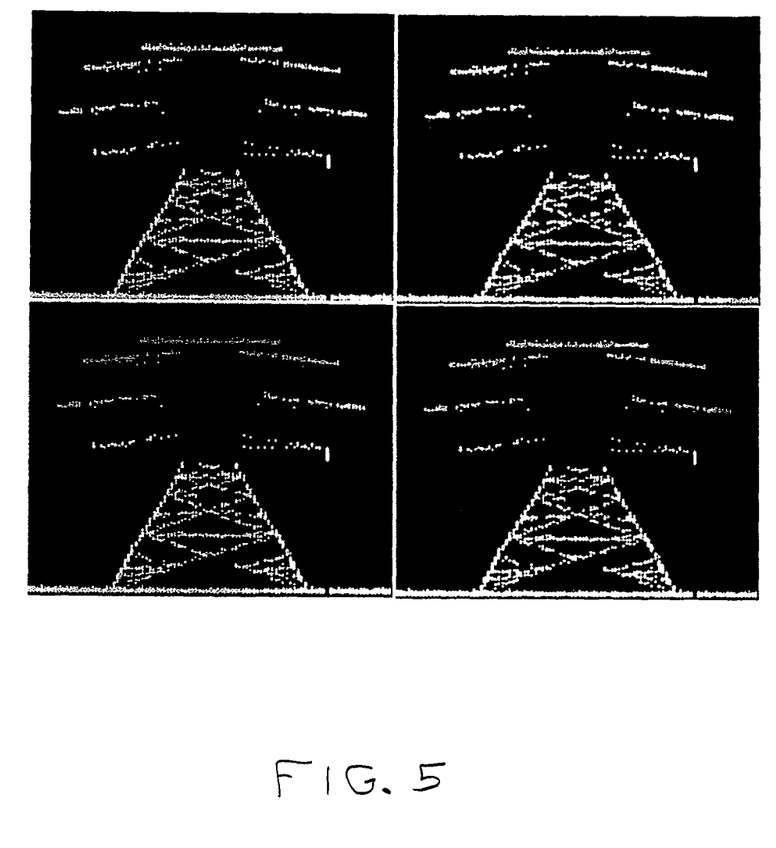
FIG. 5 is an illustration of a bi-modal coloring scheme used by the present invention.

The following steps are used by module 31 to determine when the color needs to change:
Determine dIndex/dZ to detect discontinuities or color changes with respect to the changes in height.
1.

$$\text{Execute } ColorChange = \text{find}\left(\frac{dindex}{dZ} > 0\right)$$

which localize the indices, which correspond to changes in color.
2. Use the following to assign colors indices (CI) to each point in a way which wraps all points having the same color:
Set: S=1;
While i<=length (ColorChange)
Point_Cloud1(i,:)=[X(s:ColorChange(i)), Y(s:ColorChange(i)), Z(s:ColorChange(i))];
CI(I,:)=ColorComposition(Index(S),:);
S=ColorChange(i)+1;
end Finally, system 10 combines the CI and CC of each zone with the full point cloud data to reconstruct a 3D image on display 20. FIG. 5 is an example of an image displayed by the present invention, in which a point cloud is colored by using a bi-modal color composition. One color composition is used to color all points in the point cloud that are 15 meters (the threshold) or closer from the altitude of the sensor, and the other color composition is used to color the remaining points in the point cloud data.

Using range data from the LIDAR sensors provides a means for a pilot to make informed decisions to prevent aerial accidents during brownout conditions. By providing a sensor with the appropriate visualization based on a color mapping methodology, the present invention enables the pilot to have situational awareness of the aircraft when there are vertical obstructions.

Current hazard avoidance systems use a combination of active and passive sensors. Active sensors provide the 3D information, while passive sensors provide information of the real color of the scene. However, this methodology is not useful in situational awareness scenarios, such as aircraft flying during brownout conditions. Since the passive sensor does not collect useful information due to the phenomenology of the brownout cloud, the current coloring scheme does not provide useful visualization.

The present invention, on the other hand, is useful in a brownout scenario, because it may be used based on the following criteria: If range (Ri) to an object is less than or equal to a predetermined threshold value, then that object may be considered a possible hazard. To provide an "awareness zone," the present invention may include a color distribution, for example, of red, orange and yellow. Red may mean that an object is too close to the aircraft, whereas yellow may mean that an object is just entering the range threshold. This "awareness zone" is referred to herein as Zone 1. If Ri to an object, however, is greater than the predetermined threshold, then the color composition may include a new distribution of colors (for example, HSV, RGV, Chroma, etc.), which is referred to herein as Zone 2. The color composition may be adapted to a pilot or user for distinguishing different objects and obstructions within Zone 2.

Figure 6:
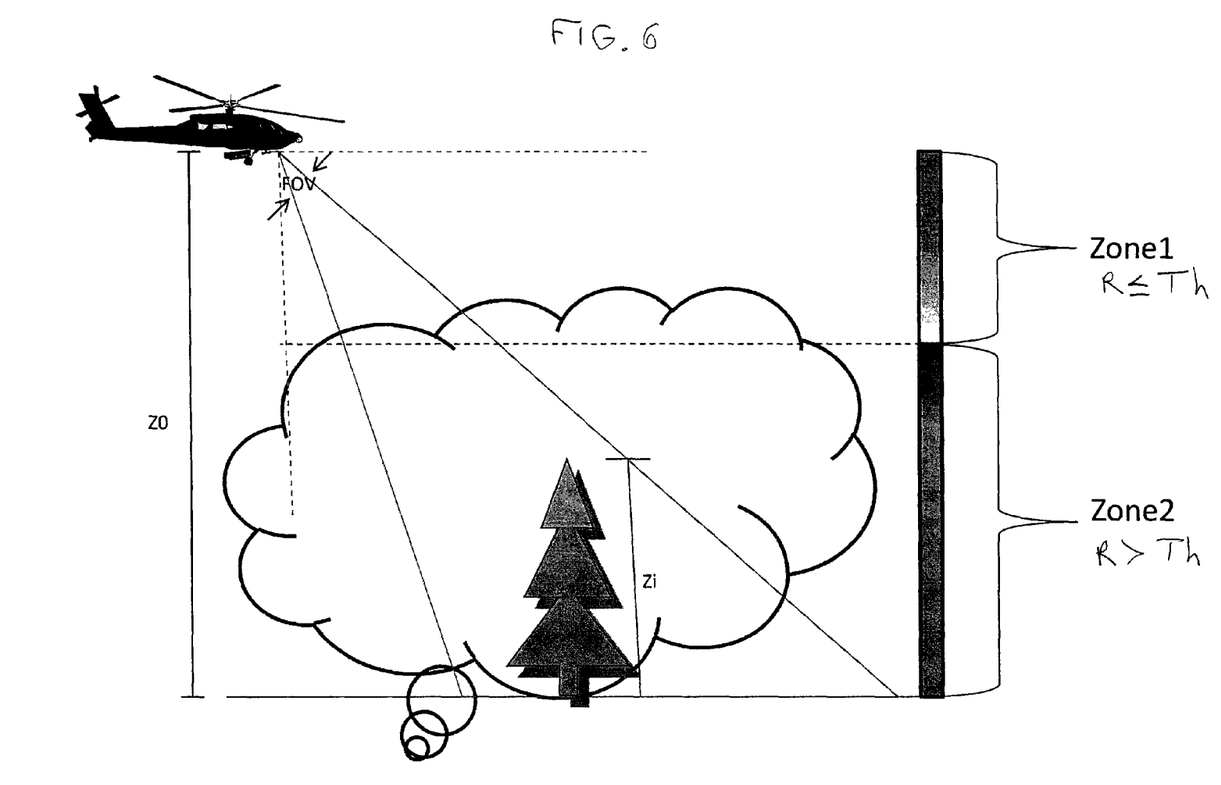
FIG. 6 is an illustration of a helicopter approaching a point cloud, in accordance with an embodiment of the present invention.
Figure 7:
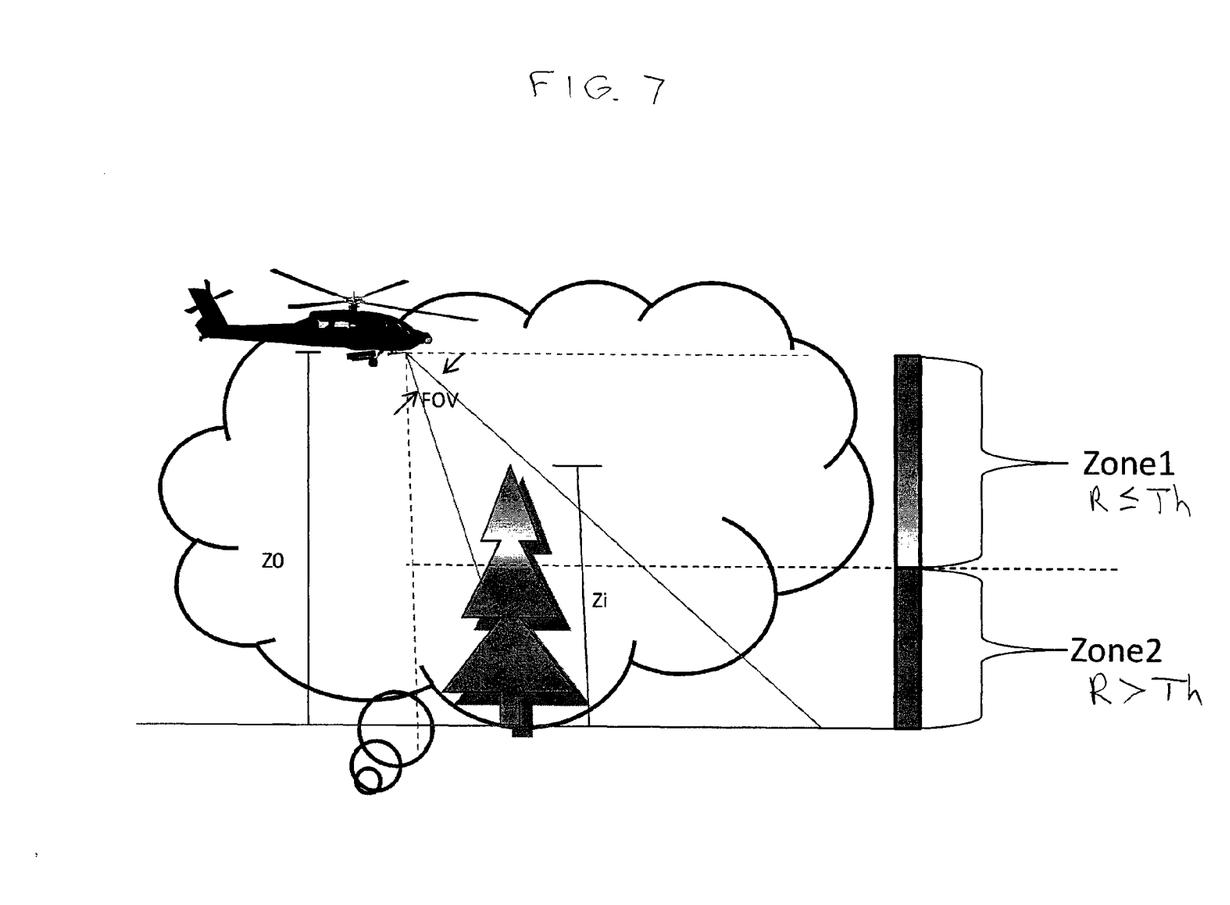
FIG. 7 is another illustration of a helicopter approaching a point cloud, in accordance with another embodiment of the present invention.

FIGS. 5, 6 and 7 illustrate a color scheme example, in which color intensities in Zone 1 vary between red and yellow, whereas color intensities in Zone 2 are not limited to such color composition. The predetermined threshold (Th) may be determined by the aircraft environment based on what is considered a safe distance. The helicopter is depicted flying under brownout conditions. More specifically, in FIG. 6, the pilot has selected the landing region and started to see a tree inside the point cloud. The tree is not a problem for the pilot, because it is colored only in Zone 2. In FIG. 7, however, the aircraft is very close to the tree and the color composition on top of the tree starts changing, because the range from the top of the tree to the sensor is within Zone 1. Thus, the color composition used in Zone 2 helps the pilot to distinguish between different objects in a scene, while the colors used in Zone 1 alerts the pilot to objects that are very close to the aircraft.

It will be appreciated that the present invention may also be used in other application, such as bathymetry, terrestrial and maritime vehicles, airplanes, airports, spaceships, and satellite systems, among others. For example, in bathymetry, the water may be considered an obscurant source; in image science, the atmosphere may be considered a source of obscurants, because it has a negative impact on data collection and quality.

In light of the foregoing description of the invention, it should be recognized that the present invention can be realized in hardware, software, or a combination of hardware and software. A method in accordance with the inventive arrangements can be realized in a centralized fashion in one processing system, or in a distributed fashion where different elements are spread across several interconnected systems. Any kind of computer system, or other apparatus adapted for carrying out the methods described herein, is suited. A typical combination of hardware and software could be a general purpose computer processor or digital signal processor with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of real-time point cloud visualization on a color display of a piloted aircraft to provide situational awareness to pilots flying under obscured condition, comprising the steps of:
   receiving point cloud data from a LIDAR, including range data of vertical obstructions between a piloted aircraft and multiple points in the point cloud indicating vertical obstructions with respect to the piloted aircraft;
   dividing the multiple points into a plurality of zones, each zone including points indicating positions of the vertical obstructions within a respective interval of range away from the piloted aircraft;
   determining an index vector for each zone of the plurality of zones using an altitude value for the piloted aircraft;
   coloring the multiple points in each zone using a plurality of colors defined by the index vector;
   indicating a range of the vertical obstructions from the piloted aircraft by displaying, on the color display device of the piloted aircraft, the multiple points indicating positions of the vertical obstructions in each zone with the plurality of colors with reference to the piloted aircraft;
   calculating a derivative of the index vector as a function of range; and
   changing the color between points, if the derivative is not continuous between the points.

2. The method of claim 1 wherein receiving the point cloud data includes receiving scanning angle data to determine orientation of each of the multiple points within the field of view (FOV) of the range sensor.

3. The method of claim 1 wherein dividing the multiple points includes dividing the multiple points into first and second zones, wherein
   the first zone includes points located closely to the range sensor, closely defined as a range interval less than a predetermined threshold value, and
   the second zone includes points located remotely from the range sensor, remotely defined as a range interval greater than the predetermined threshold value.

4. The method of claim 3 wherein the predetermined threshold is determined by an operational environment of an airborne platform.

5. The method of claim 1 wherein receiving the point cloud data includes receiving the point cloud data from the range sensor disposed on an airborne platform.

6. The method of claim 1 wherein coloring the multiple points includes the steps of:
   receiving a color composition (CC) for each of the zones, and
   assigning color index values to each of the zones, wherein each color index value includes a value between zero and a maximum number in the respective zone, and the color index value is based on a distance between the range sensor and a respective point in the respective zone.

7. The method of claim 6 wherein receiving the color composition for each of the zones includes receiving a 3×N matrix in which each column corresponds to one of an RGB color space, or one of an HSI color space.

8. The method of claim 6 further including the color index value is based on a minimum distance between an airborne platform housing the range sensor and a ground terrain below the airborne platform.

9. The method of claim 8 wherein the distance and minimum distance are height of each point above the ground terrain and height of the airborne platform above the ground terrain, respectively.

10. The method of claim 1 wherein coloring the multiple points includes the steps of:
    determining a first range value between the range sensor and a first point in the point cloud;
    determining a second range value between the range sensor and a second point in the point cloud;
    determining a change in value between the first range value and the second range value; and
    coloring the first point differently from the second point, if the change in value exceeds a predetermined value.

11. A computer program product which, when loaded in a computer system, causes the computer system to carry out steps for generating a real-time point cloud visualization on a display of a piloted aircraft to provide situational awareness to the pilot flying under obscured conditions, the steps comprising:
    receiving point cloud data from a LIDAR system disposed in the piloted aircraft, including range data between the LIDAR system and multiple points indicating positions of the vertical obstructions in the point cloud data,
    placing the multiple points into first and second zones, wherein the first zone includes range data of points in the point cloud located within a first distance from the piloted aircraft, and the second zone includes range data of points in the point cloud located further than the first distance from the piloted aircraft,
    determining an index vector for the first zone and the second zone using an altitude value for the piloted aircraft;
    coloring the points in the first zone with a first color composition and coloring the points in the second zone with a second color composition, and
    displaying on a color display of the piloted aircraft colored points in the first zone and colored points in the second zone, wherein the respective color compositions indicate a ranges of a vertical obstruction to the piloted aircraft;
    assigning color index values to each of the zones, wherein:
        each color index value includes a value between zero and a maximum number in the respective zone, and
        the color index value depends on a distance between the LIDAR system disposed in the piloted aircraft and a respective point in the respective zone defining an indexing function;
    calculating a derivative of the indexing function containing two points in a respective zone, and
    changing, on the color display, the colors between the two points in the respective zone, if the derivative of the indexing function is not continuous between the first and second points.

12. The computer program product of claim 11, wherein when loaded in a computer system causes the computer system to carry out steps, further comprising steps of:
  setting a predetermined threshold of the piloted aircraft, and
  the first distance extends from the piloted aircraft to the predetermined threshold.

13. The computer program product of claim 11 wherein the color index value further depends on a minimum distance between the piloted aircraft and a ground terrain below the piloted aircraft.

14. The computer program product of claim 13 wherein the distance and minimum distance are height of each point above the ground terrain and height of the piloted aircraft above the ground terrain, respectively.

15. A computer program product which, when loaded in a computer system, causes the computer system to carry out steps for generating a display of vertical obstructions for alerting a crew in an airborne platform, the steps comprising:
  receiving point cloud data from a LIDAR system disposed in an airborne platform, including range data between the LIDAR system and multiple points in the point cloud indicating vertical obstructions with respect to the airborne platform,
  placing the multiple points into first and second zones, wherein the first zone includes range data of points in the point cloud representing vertical obstructions located within a first distance from the airborne platform, and the second zone includes range data of points in the point cloud representing objects located further than the first distance from the airborne platform, wherein the first distance is predetermined by an operational environment of the airborne platform,
  coloring the points in the first zone with a first color composition and coloring the points in the second zone with a second color composition,
  displaying the colored points in the first zone and the colored points in the second zone, wherein the color composition in the first zone indicates a vertical obstruction to the airborne platform,
  assigning color index values to each of the zones,
  wherein each color index value includes a value between zero and a maximum number in the respective zone, and
  the color index value depends on a distance between the LIDAR system and a respective point in the respective zone, and
  the color index value is based on the following equations:

$$\text{Index1} = \text{round}\left(\left|\frac{|Z_i - Z_0|}{Th} - 1\right| * N_1\right) \quad \text{Eq. 1}$$

$$\text{Index2} = \text{round}\left(\left|\frac{|(Z_i - Z_0 + Th)|}{Z_{min} - Z_0 + Th} - 1\right| * N_2\right) \quad \text{Eq. 2}$$

where
$N_1$ is a length of one color composition for color index 1,
$N_2$ is a length of another color composition for color index 2,
$Z_0$ is platform altitude
$Z_i$ is height of each point in the cloud,
Th is the predetermined threshold value, and
$Z_{min}$ is the minimum height of the platform.

* * * * *